United States Patent [19]
Aoyagi

[11] 3,805,446
[45] Apr. 23, 1974

[54] MULCHING FILM
[75] Inventor: Kimio Aoyagi, Tokyo, Japan
[73] Assignees: Mitsubishi Petrochemical Co., Ltd., Tokyo; Mikado Manufacturing Co., Ltd., Chiba-shi, both of, Japan
[22] Filed: Apr. 12, 1972
[21] Appl. No.: 243,303

[30] Foreign Application Priority Data
Apr. 12, 1971 Japan.................................. 46-27791

[52] U.S. Cl. ..................................................... 47/9
[51] Int. Cl............................................... A01g 1/00
[58] Field of Search..................................... 47/9, 56

[56] References Cited
UNITED STATES PATENTS
3,160,986  12/1964  Watson et al........................... 47/56
3,559,599  2/1971   Hoadley................................ 47/9 X
1,553,035  9/1925   Eckart..................................... 47/9
2,740,233  4/1956   Reynolds................................ 47/9
3,287,850  11/1966  Da Valle................................. 47/9
3,580,196  5/1971   Lofgreen.............................. 47/9 X Primary Examiner—Hubert E. Bagwill
Attorney, Agent, or Firm—Oblon, Fisher, Spivak, McClelland and Maier

[57] ABSTRACT

A mulching film of synthetic material of substantial length in a running direction having a plurality of short parallel slits or linear apertures formed therein in at least one row extending in the running direction of the film. The film is used to cover fields in which seeds or seedlings are planted.

4 Claims, 6 Drawing Figures

PATENTED APR 23 1974   3,805,446

MULCHING FILM

BACKGROUND OF THE INVENTION

1. Field Of The Invention:

This invention relates to a mulching film for covering fields which are used for cultivation of grains, such as upland rice, barley and wheat, and vegetables, such as carrots and the like.

2. Description Of The Prior Art:

It is well known that mulching films made from synthetic materials having many planting holes properly spaced therein permit a suitable planting arrangement of seeds or seedlings in the field. When such mulching films are spread over a field, seeds may be sewn and seedlings may be transplanted into the planting holes.

Drawbacks to the conventional method of using synthetic mulching films, however, are that a lot of labor is required and the films are not applicable for planting in a wide plantation.

Mulching films having linear apertures instead of planting holes have been considered in the past. However, conventional films having such linear apertures cut by a knife are easily torn and have been too difficult to use for practical application in fields. The conventional films having linear apertures or slits are easily torn when a strong wind blows or when a farmer walks on the film. In addition, when seedlings are transplanted, many large holes are made by hand in the film by the transplantation process. However, mechanical planting processes utilizing tractors and the like are required if labor and other costs are to be decreased.

SUMMARY OF THE INVENTION

Accordingly, it is an object of this invention to provide a mulching film for covering a field to increase the temperature of the soil so as to accelerate the germination of seeds and to accelerate the earing process.

It is another object of this invention to provide an improved process for planting seeds or seedlings in a field by using a mulching film to cover the field so as to achieve an increased yield of plants.

It is still another object of this invention to provide a process for using a specific type of synthetic film having many linear apertures as a mulching film covering a field.

These and other objects of this invention, as will hereinafter become more readily apparent have been attained through the provision of a mulching film having many parallel lines of apertures or slits wherein the series of linear apertures of each line are made by heat cutting techniques leaving appropriate uncut gaps between the linear apertures.

The mulching film of this invention can be used in two ways. After a field has been cultured, dressed and fertilized, terraces or ridges are formed in the field and seeds are sewn thereon in such a manner so as to correspond to the lines of apertures in the mulching film. Then the mulching film is placed on the terraces for covering the same, and the film is fixedly secured to the soil by heaping soil along the edges thereof.

When seedlings are being transplanted, the mulching film is first applied to the terraces, and then the seedlings are transplanted through the linear slits or apertures therein. When seeds are sewn, the young plants will grow through the linear apertures of the mulching film.

In the early stages of plant growth the uncut gaps between a series of linear apertures in a line prevent ballooning and consequent tearing of the mulching film in strong winds. As the plants grow, the linear apertures are stretched and the gaps between the linear apertures are split permitting larger openings for the growing plants. Accordingly, the soil covered by the mulching film is maintained at temperatures sufficient to accelerate plant growth.

The linear apertures in the synthetic films are prepared by such techniques as hot knife cutting, high frequency splitting, supersonic cutting and the like, with the result that sufficient strength in the uncut gaps is maintained to prevent further splitting. However, the uncut gaps may be torn by hand when transplanting seedlings.

BRIEF DESCRIPTION OF THE DRAWINGS

Various other objects, features and attendant advantages of the present invention will be more fully appreciated as the same becomes better understood by reference to the following detailed description when considered in connection with the accompanying drawings, wherein.

DETAILED DESCRIPTION OF THE PREFERRED EMBODIMENTS

Figure 1:
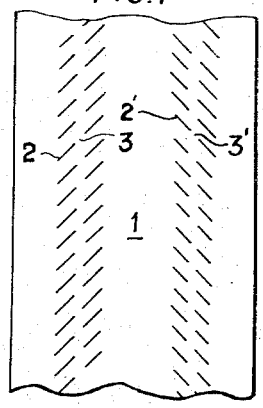
FIGS. 1–5 are plan views of different embodiments of the mulching film of this invention; and, FIG. 6 is a schematic view of a field covered with a mulching film of this invention.

Referring now to the drawings, and more particularly to FIG. 1 thereof, a mulching film 1 is shown having two longitudinally extending rows of parallel lines of slits or linear apertures separated by uncut gap portions. In one row, each slit 2 is separated by an uncut gap 3, and the slits or linear apertures 2 are arranged oblique to the longitudinal, or running, direction of the film, while in the other row, each slit 2' is separated by an uncut gap 3', and the slits 2' are slanted in an opposite direction, such that the lines containing slits 2 intersect the lines containing slits 2' at substantially right angles.

Figure 2:
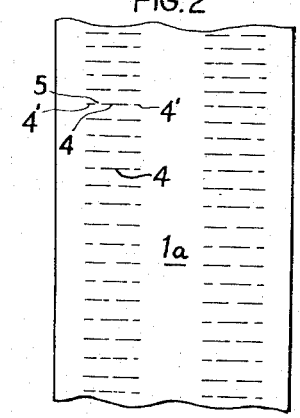

In FIG. 2, an embodiment of the mulching film 1a is shown having two rows of parallel lines of spaced slits or linear apertures which lie transversely across the film, or at right angles to the running direction thereof. Adjacent lines thus have two long slits 4 separated by an uncut gap 5 and a single central long slit 4 having two short slits 4' on either side thereof, being spaced therefrom by a gap 5, respectively.

The length of the linear apertures is usually 5–150 mm, preferably 5–60 mm and especially 20–50 mm with the length of the uncut gaps alternating with the linear aperture usually being 1–50 mm in length, preferably 1–10 mm and especially 3–5 mm. The space separating the parallel lines containing the linear apertures and uncut gaps is usually 5–50 mm, preferably being 5–20 mm and especially 5–12 mm.

In order to achieve a staggered disposition of linear apertures with respect to uncut gaps in the longitudinal array of successive parallel lines in the mulching film of FIG. 2, lines having an arrangement of a short linear aperture 4', an uncut gap 5, a long linear aperture 4, an uncut gap 5, and short linear aperture 4' alternate with lines having an arrangement of a long linear aperture 4, an uncut gap 5, and another long linear aperture 4.

When the linear apertures of the mulching film are too long, uneven stresses are exerted on the film causing the film to tear in the uncut gaps between the linear apertures, resulting in large openings in the film. Wind then balloons the film by blowing into the large openings causing further tearing of the film and decreasing the soil temperature under the film.

The mulching films of this invention provide a method of supplying herbicides to the soil. Mulching films are coated on the surface thereof which is to be placed next to the soil with a herbicidal composition prior to the application of the films to the soil. Water, which evaporates from the soil condenses on the under-surface of the film dissolving some of the herbicide, then drops back into the soil, thereby supplying the soil with the herbicidal composition. If large openings are present in the mulching film, the wind that blows into these openings disperses the evaporated moisture, thereby disrupting the supply of herbicide to the soil.

In order to curtail these adverse effects caused by large openings, the lengths of the linear apertures must carefully be considered. The arrangement of linear apertures and uncut gaps therebetween on the mulching film can nevertheless take various forms.

Figure 3:
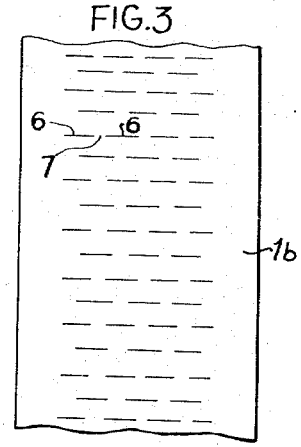

In the embodiment shown in FIG. 3, the mulching film 1b has parallel lines of slits 6 and uncut gaps 7 therebetween arranged transversely across the film and being alternatively arranged from line to line so that each slit 6 lies between uncut gaps 7 of the adjacent lines on either side thereof, and each uncut gap 7 similarly lies between slits 6 of the adjacent lines on either side thereof. The lines do not extend fully across the film, however, as the side edges thereof are left uncut for providing a hold-down surface on the film.

Figure 4:
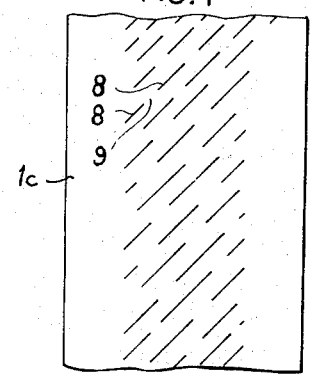

The mulching film 1c of the embodiment shown in FIG. 4 is similar to that illustrated in FIG. 3, except that the parallel lines of slits or linear apertures designated by the reference numeral 8 separated by uncut portions or spacing gaps designated by the reference numeral 9 are arranged obliquely or in a slanted fashion relative to the running direction of the film. In this embodiment also, however, the linear apertures and uncut portions therebetween are alternatively arranged with respect to the corresponding parts of adjacent lines, and the side edges of the film are not split.

Figure 5:
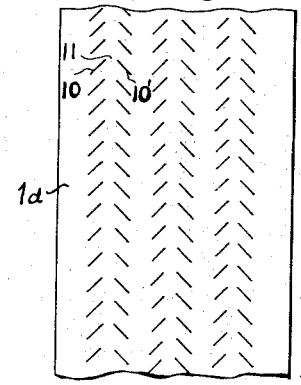

FIG. 5 shows an embodiment of a mulching film 1d according to this invention having a plurality of rows, shown as being three in number extending in the running direction of the film, with each row having parallel lines also extending in the running direction of the film, but one of the lines of each row has parallel slits or linear apertures 10 obliquely oriented on the film in one direction, while the other line has parallel slits 10' obliquely oriented in an opposite fashion, such that adjacent slits 10 and 10' on an imaginary transverse line across the film are oriented substantially perpendicular to each other, being spaced however by an uncut gap 11.

Figure 6:
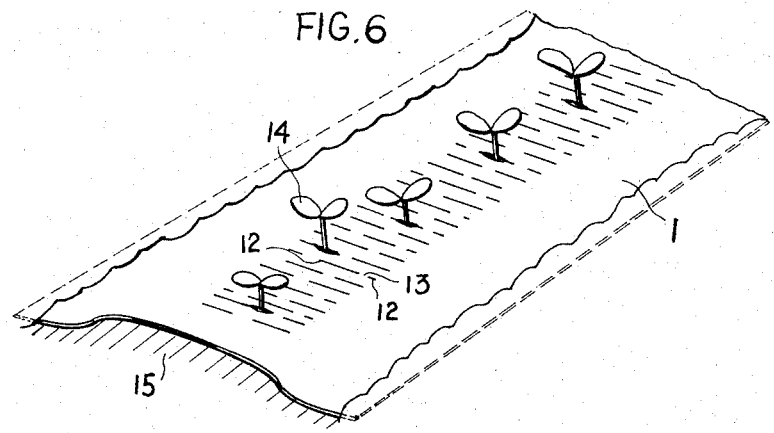

FIG. 6 is a view of a field 15 covered with a mulching film 1 of this invention wherein the film has parallel lines extending transversely across the film relative to the running direction thereof and containing linear apertures 12 separated by uncut gaps 13, with each line being alternatively arranged or staggered so that each slit or linear aperture 12 lies between uncut gaps 13 of adjacent lines on either side thereof, and vice versa. The seedlings 14 are shown projecting through the linear apertures 12 and the film 1 is shown being secured to the surface of the soil by heaping soil along the side edges of the film.

The mulching film of this invention accordingly provides a way of accelerating the germination rate of seeds by increasing the temperature of the soil under the film and by preventing the escape of needed moisture from the soil.

In order to show the effectiveness of the mulching film of this invention, results obtained from a field planted with rice are shown.

EXPERIMENTAL TESTS

Test of the mulching film in a dry paddy field

The tests on the mulching film of this invention were made in a paddy field planted with rice. The experimental conditions and results obtained are as follows:

Test Field:
  Dry paddy field drained by a drain and a duct; (about 3.0 a).
  Depth of cultured soil; about 12 cm
  Mulching film: width — 80 cm
  length of linear apertures — 8 cm.
  distance between lines of linear apertures in running direction of film — 1.5 cm.
  Parallel lines arranged to provide alternate or staggered positioning of linear apertures or slits and uncut gap portions in adjacent lines.

Brief of Culture:
  Terms of Culture:
    First —March 10
    Second —April 14 (rotary machine culture)
  Kind of seeds: Rice (Manryo)
  Seeding Terms: April 16, (basic fertilizer April 14)
  Water Supply: June 28
  Fertilizer:

|  | Basic Fertilizer | | | Top Dressing (N) | |
|---|---|---|---|---|---|
|  | N | $P_2O_5$ | $K_2O$ | July 6 | July 31 |
| Standard | 0.8 | 0.8 | 0.8 kg/a | 0.3 | 0.2 kg/a |
| High Fertilizer | 1.2 | 1.2 | 1.2 kg/a | 0.3 | 0.4 kg/a |

Mowing: October 16

Test Field:

|  | Term of Cover | Space of Ridge (cm) |
|---|---|---|
| Control | No covering | 46 cm |
| Mulching film Cover A | April 16 – May 21 | 60 cm |
| Mulching film Cover B | April 16 – Harvest | 51 cm |

TEST RESULTS

| Date | Temperature (° C.) | Sunshine time (hr.) | Amount of sunshine (cal.) | Temperature (° C.) under earth | | | | | |
|---|---|---|---|---|---|---|---|---|---|
|  |  |  |  | Control, depth of— | | Mulching film cover, depth of— | | Rise of temp. by mulching film, depth of— | |
|  |  |  |  | 5 cm. | 10 cm. | 5 cm. | 10 cm. | 5 cm. | 10 cm. |
| May: |  |  |  |  |  |  |  |  |  |
| 7 | 15.7 | 7.8 | 519 | 21.5 | 18.5 | 25.5 | 21.5 | 4.0 | 3.0 |
| 10 | 15.4 | 10.6 | 448 | 18.0 | 16.0 | 20.0 | 18.5 | 2.0 | 2.5 |
| 11 | 18.4 | 11.3 | 537 | 22.5 | 19.5 | 25.5 | 23.0 | 3.0 | 3.5 |
| 12 | 20.2 | 8.7 | 514 | 24.5 | 21.5 | 28.5 | 25.5 | 4.0 | 4.0 |
| 19 | 15.4 |  | 126 | 23.0 | 22.0 | 25.0 | 24.0 | 2.0 | 2.0 |
| June: |  |  |  |  |  |  |  |  |  |
| 1 | 20.8 | 5.6 | 372 | 25.5 | 24.5 | 25.5 | 24.7 | 0.0 | 0.2 |
| 8 | 21.1 | 7.8 | 454 | 23.3 | 23.4 | 24.0 | 24.0 | 0.7 | 0.6 |

Beginning of Germination:
  Control —May 11
  Mulching Film —May 7
Ear:
  Control —August 27
  Mulching Film — August 24

Nitrogen content in soil measured prior to the first top dressing.

Standard Field:

|  |  | $NH_4$-N mg/100 g |
|---|---|---|
| Standard Field | Control | 0.19 |
|  | Mulching Film Cover A | 0.37 |
|  | Mulching Film Cover B | 0.31 |

Yield:

|  | Amount/m.² | | | | | |
|---|---|---|---|---|---|---|
|  | Total (g.) | Straw (g.) | Un-hulled rice (g.) | Ears (number) | Semi-polished rice (g.) | Waste rice (g.) |
| Standard: | | | | | | |
| Control | 900 | 404 | 387 | 209 | 338 | 5.2 |
| Mulching film: | | | | | | |
| Cover A | 957 | 441 | 391 | 200 | 343 | 3.5 |
| Cover B | 1,134 | 548 | 450 | 254 | 389 | 5.3 |
| High fertilizer: | | | | | | |
| Control | 999 | 452 | 417 | 219 | 362 | 7.0 |
| Mulching film: | | | | | | |
| Cover A | 981 | 474 | 387 | 201 | 331 | 4.8 |
| Cover B | 1,276 | 636 | 456 | 238 | 393 | 5.6 |

TEST RESULTS

The results of these experiments show an effective rise in the temperature under the mulching film of this invention and an acceleration of the germination of the rice seeds of about 4 days in the fields covered therewith. Earing of rice was accelerated about 3 days in the fields covered with the mulching film and the ammonia type N content in the cultured soil covered with the mulching film was higher than the control. Also, during the growing period, the height and number of claims were greater in the field covered with the mulching film than in the uncovered field, while during the ripening period, the length and number of ears were greater in the field covered with the mulching film than those in the uncovered field. Although the mulching film was removed on May 21, no clear difference in plant height, numbers of culms, numbers of ears, length of ears and amount of ammonia type N was found when compared to the same data received from a field covered with the mulching film until the ears matured.

Obviously many modifications and variations of the present invention are possible in light of these teachings. It is to be understood therefore that within the scope of the appended claims the invention may be practiced otherwise than as specifically described herein. What is claimed as new and desired to be secured by Letters Patent of the United States is:

1. An article of manufacture comprising a thin mulching film of synthetic material for covering soil in which plants are to be grown and for enhancing the growth of such plants in the soil by increasing the temperature and keeping moisture retained therein, and having a plurality of parallel lines of spaced linear slits heat cut thereinto, and wherein the length of the linear slits is no greater than 150 mm and the spacing therebetween in each line is no greater than 50 mm, and the spacing between lines is no greater than 50mm.

2. The mulching film for covering a field of claim 1 wherein the linear slits of each line are spaced by uncut gap portions and the lines are alternatively arranged so that the linear slits of each line are positioned between uncut gap portions of adjacent lines on either side thereof and the uncut gap portions are positioned between linear slits in the adjacent lines on each side thereof.

3. The mulching film for covering soil as set forth in claim 2 further comprising one surface of said mulching film being coated with a selected plant treating material, whereby said surface of said film may be placed adjacent the soil to be covered by the mulching film, and said film being substantially impervious to the passage of water therethrough so that water evaporated from said soil covered by said film condenses on said film surface and drops therefrom and thereby transfers said plant treating material from said film to the soil covered thereby.

4. The mulching film for covering soil as set forth in claim 1, wherein the lines of linear slits of one row are oblique to the running direction of said film and the lines of linear slits of another row are oblique to said running direction in an opposite sense, such that the lines of one row are substantially perpendicular to the lines of the other row.

* * * * *